UNITED STATES PATENT OFFICE.

BERNHARD H. REMMERS AND JOHN WILLIAMSON, OF GLASGOW, COUNTY OF LANARK, SCOTLAND.

REFINING AND PURIFYING SUGAR.

SPECIFICATION forming part of Letters Patent No. 255,021, dated March 14, 1882.

Application filed October 20, 1881. (No specimens.) Patented in England July 14, 1880.

*To all whom it may concern:*

Be it known that we, BERNHARD HEINRICH REMMERS and JOHN WILLIAMSON, residing at Glasgow, in the county of Lanark, Scotland, and subjects of the Queen of Great Britain and Ireland, have invented certain Improvements in and connected with the Refining or Purifying of Sugar, Saccharine Matter, and Oils, (for which we obtained a patent in Great Britain, No. 2,902, dated July 14, 1880,) of which the following is a specification.

Our said invention relates to certain improvements connected with the refining of sugar, which are specially designed to facilitate filtration of sugar-liquor, saccharine matter, and oils, and render the process much less expensive than hitherto, while effecting great saving in the amount and cost of the material employed as a filtering medium, reducing the amount of labor, and allowing a greater quantity than usual of crystallizable sugar to be produced from any fixed quantity and density of sugar-liquor.

In the method hitherto adopted for refining and clarifying beet-sugar, cane-sugar, or mixtures of cane-sugar and beet-sugar by filtration the impure or raw sugar dissolved in the "blow-ups," or the sugar-juice after expression from the sugar-cane or beet, is heated to a certain temperature, and is made to descend by gravitation through a vertically-arranged series of filtering-bags, which have to be frequently washed and renewed, owing to the gum or mucilage contained in the cane-sugar liquor, or in mixtures of cane-sugar and beet-sugar liquor, quickly closing up the interstices of the filtering-cloth; and it has heretofore been found impracticable to utilize the expeditious mode of filtering by means of filter-presses, owing to the same cause, unless in sugars filtered from sucrate of lime; but by the present improvements the sugar-liquor is treated before undergoing filtration, so as to admit of either the old process or any of the newer methods of filtering being employed with great advantage.

The invention consists essentially in adding to and mixing with the impure sugar dissolved in the blow-ups, or to and with the dissolved sugar after removal to a separate vessel or tank, or to and with the sugar-juice after expression from the cane or beet, a quantity of finely ground or pulverized vegetable charcoal, preferably in the form of "powder-grist," varying in amount, according to the ascertained proportion of gum or mucilage in the liquor, from about one-fourth to two and one-half per centum, more or less, by weight, of the sugar-liquor in the vessel; but we do not limit ourselves to any particular proportion of charcoal to liquor or the ascertained mucilage therein; nor do we confine ourselves to any precise size of grain in the charcoal used. Very coarsely grained charcoal and, on the other hand, charcoal pulverized like dust or flour will not, as a rule, be so effective as charcoal in the form of powder-grist. This powdered charcoal, when mixed with the sugar-liquor, absorbs a very large proportion or nearly all the gum or mucilage, as well as a portion of the coloring-matter, which the liquor contains. The sugar-liquor so treated is then filtered either in the usual way or, as is preferred, by being forced through a filter-press of the kind commonly used for the filtration of beet-root sugars containing a large amount of lime residues, and for the filtration of other like substances. The purified liquor drawn from the filter bags or press is then ready for the subsequent treatment required for decolorizing, which may consist of passing the filtered sugar-liquor through a stratum of animal charcoal. In consequence of the removal of the mucilage and the partial decolorization effected by the previous use of the vegetable charcoal, a larger quantity of sugar-liquor will be completely decolorized by an equal amount of animal charcoal in an equal period of time. Besides this advantage, there is the advantage in our invention that the sugar-liquors, after being mixed with the vegetable charcoal, require much less filter-cloth (whether in bags or presses) for their filtration than they require when filtered without being so previously treated with vegetable charcoal. When filtered by this rapid method (according to which filtration can be effected at a much lower temperature and greater density than heretofore) the formation of fructose or fruit-sugar is also prevented or retarded, and a considerable proportion of the sugar-liquor which has been heretofore converted into sirup is retained as crystallizable sugar, and a gain is effected corresponding to the difference in the value of the sugar saved and of the sirup which formerly resulted from the process.

The solid residue of the filtering process, consisting mainly of charcoal, sand, sugar, gum or mucilage, fibrous material, and coloring-matter, is retained in the filter-bags or the filter-press, as the case may be, in the form of solid lumps or cakes, which may be treated for the recovery of the vegetable charcoal and sugar, first, by washing the lumps or cakes with hot water or steam, which is either passed through the lumps or cakes in the filter-bags or filter-press or used to dissolve the lumps or cakes after they are removed therefrom. The resulting liquor of this washing process is retained for recovery of the sugar contained in it. The solid residue of the lumps or cakes is then treated with a caustic alkali, which dissolves out all the gum or mucilage and coloring-matter contained in the pores of the charcoal. After passing this residue through a filter-press the cakes retained in the press are neutralized by washing them with an acid, preferably sulphurous. The vegetable charcoal is then ready for being used again in the process as before described; or, again, the vegetable charcoal, after being freed from all sugar by washing, can be reburned or revivified in the same manner as animal charcoal is at present revivified in refineries. After the vegetable charcoal is taken from the kilns and finely pulverized it is in a fit state for being used over again.

In the treatment of other saccharine bodies—such as glucose—previous to filtration, we add from one-fourth to two and one-half per centum (more or less) of vegetable-charcoal grist, and filter, as hereinbefore described.

In the treatment of oils, whether of animal, vegetable, or mineral origin, substantially the same process may be applied. The charcoal is mixed with the oil, with or without heating, according to the kind of oil to be treated. The experienced oil-refiner will know whether heat is requisite or not, and what degree of heat is required. After thorough intermixture of the charcoal with the oil, it is filtered either through bags or through a filter-press, and then the process is finished, unless in cases where it may be thought advisable to pass the oil subsequently through animal charcoal or other subsequent treatment for decolorization.

The proportion of vegetable-charcoal grist which requires to be added previous to the filtration for the purpose of removing the mucilage will vary with the kind and quality of the oil, but can easily be determined by previous experiment on a small quantity of the oil to be treated.

What we claim as our invention is—

As an improvement in the art of filtering sugar-liquors and oils, the mode herein described of facilitating the filtering process, said mode consisting in mixing vegetable charcoal with the liquid prior to filtration, so as to absorb the mucilage or gum contained therein, substantially as set forth.

In testimony whereof we have signed our names to this specification in the presence of two subscribing witnesses.

B. H. REMMERS.
JOHN WILLIAMSON.

Witnesses:
WALLACE FAIRWEATHER,
JOHN SIME.